United States Patent [19]

Bjorkholm et al.

[11] 4,058,739
[45] Nov. 15, 1977

[54] METHOD AND APPARATUS FOR PHASE MATCHING BY ADJUSTMENT OF THE FUNDAMENTAL FREQUENCIES

[75] Inventors: John Ernst Bjorkholm, Holmdel; Gary Carl Bjorklund, West Windsor; Paul Foo-Hung Liao, Middletown, all of N.J.

[73] Assignee: Bell Telephone Laboratories, Incorporated, Murray Hill, N.J.

[21] Appl. No.: 746,161

[22] Filed: Nov. 30, 1976

[51] Int. Cl.$^2$ .............................................. H03F 7/00
[52] U.S. Cl. ..................................... 307/88.3; 330/4.5
[58] Field of Search ........................................ 307/88.3

[56] References Cited

U.S. PATENT DOCUMENTS

| 3,795,819 | 3/1974 | Harris | 307/88.3 |
| 3,816,754 | 6/1974 | Hodgson et al. | 307/88.3 |
| 3,892,979 | 7/1975 | Hodgson et al. | 307/88.3 |
| 3,914,618 | 10/1975 | Harris | 307/88.3 |

OTHER PUBLICATIONS

Armstrong et al., "Physical Review," 9-15-62, pp. 1918-1939.
Zerniky, "Physical Review Letters," 5-5-69, pp. 931-933.

Primary Examiner—Rudolph V. Rolinec
Assistant Examiner—Darwin R. Hostetter
Attorney, Agent, or Firm—Daniel D. Dubosky

[57] ABSTRACT

A method and apparatus for phase-matching the output of a four-wave nonlinear optical mixing process is disclosed. The method produces phase-matching that is independent of variations in density of the conversion medium and extends over the entire frequency spectrum from the far infrared to the vacuum ultraviolet. The phase-matching is accomplished by adjustment of the frequencies of three input lasers so that the desired frequency is produced, the condition for two-photon resonance enhancement is met, and the phase-matching condition is satisfied.

8 Claims, 7 Drawing Figures

METHOD AND APPARATUS FOR PHASE MATCHING BY ADJUSTMENT OF THE FUNDAMENTAL FREQUENCIES

BACKGROUND OF THE INVENTION

When the beams of three lasers are directed through a suitable medium; they combine to form a nonlinear polarization at all possible frequency combinations, $\omega_4 = \pm\omega_1 \pm\omega_2 \pm\omega_3$; and coherent radiation at frequency $\omega_4$ is in turn generated by the nonlinear polarization. As the induced polarization wave passes through the medium, it travels in a manner governed by the vector sum of the wave numbers of the three beams, or $(\overline{K}_1 + \overline{K}_2 + \overline{K}_3)$. This vector sum, in general, is not equal to the vector wave number $\overline{K}_4$ of the generated radiation (since propagation is frequently dependent). Since the generating wave and the generated wave travel with different velocities and directions, the radiation produced in different parts of the medium will not be in phase, and destructive interference will reduce the amount of generated radiation emitting from the conversion medium. The condition for constructive addition of the output from different portions of the medium is $$\overline{K}_1 + \overline{K}_2 + \overline{K}_3 = \overline{K}_4$$

or, for the collinear propagation, $$(\omega_1 n_1/c) + (\omega_2 n_2/c) + (10\omega_3 n_3/c) + (\omega_4 n_4/c),$$

where $n_i$ is the index of refraction of the medium for frequency $\omega_i$. The problem of satisfying the latter equation is known as the phase-matching problem. In the prior art, the frequencies involved in this equation have generally been held fixed, while attempts were made to satisfy the equation by changing the indices of refraction.

In gaseous media, for example, the standard approach has been to add a gas, the frequency dependence of which is opposite to that of the conversion medium. See, for example, U.S. Pat. No. 3,795,819, issued to S. E. Harris on Mar. 5, 1974. By appropriate choice of the mixture, the index of refraction can be adjusted to match the speed of the generating and generated waves. This technique suffers from a number of practical problems. Notably, it is very difficult to achieve the correct proportions over a substantial length and, typically, only a small fraction of the conversion medium will have the correct ratio of components and will contribute to the coversion. In the case of crystalline conversion media, the temperature is sometimes varied in order to change the index. See, for example, the article by F. Zernike, *Physical Review Letters*, Vol. 22, No. 931 (1969). Another method involves the recognition that appropriate indices of refraction may be found near the anomalous dispersion produced by a resonance. This was suggested by Armstrong et al in their article in *Physical Review*, Vol. 127, No. 20, page 1183 (1962) and was demonstrated in solids in 1969 by Zernike as previously stated. This prior art was unable to achieve resonance enhancement and phase matching simultaneously.

Typically, the prior art (see, for example, U.S. Pat. No. 3,914,618, issued to S. E. Harris on Oct. 21, 1975) increased the strength of the output signal by the use of a two-photon resonant enhancement of the nonlinear susceptibility, wherein the sum or difference of two of the input frequencies is made equal to $\Omega$, the equivalent frequency of a transition which requires the emission or absorption of two photons. See FIG. 2, showing a typical prior art level diagram. Only two lasers were used, one adjusted to a frequency $\omega_1 \approx \Omega/2$ and a second one adjusted to a frequency $\omega_2$. The output frequency $\omega_3$ is then equal to $2\omega_1 \pm \omega_2$, where two phontons from laser 1 and one photon from laser 2 combined to form the output. The fact that $2\omega_1$ is close to $\Omega$ results in resonance enhancement of this particular combination out of the possible combinations of the two lasers ($2\omega_1 \pm \omega_2$, $2\omega_2 \pm \omega_1$, etc.), which in turn results in a strong signal. Absent a phase-matching gas the output frequency is not phase-matched and only a portion of the conversion medium contributes to providing an output. The first Harris U.S. Pat. No. 3,795,819 discloses the use of three lasers, but teaches no difference between a threelaser apparatus and a two-laser apparatus.

One method in the prior art takes advantage of a pecularity that results when there is available a closely spaced doublet line. See, for example, U.S. Pat. Nos. 3,816,744 and 3,892,979 issued to R. T. Hodgson on June 11, 1974 and July 1, 1975, respectively. There, the two-photon resonance $\Omega$ is reached by one laser, but not directly. Instead of having $2\omega_1 = \Omega$, $\omega_1$ is adjusted to a higher frequency than $\Omega$, as indicated in the energy level diagram of FIG. 4, so that the photon of frequency $\omega_1$ has an energy between the energy levels at a closely-spaced doublet, which frequency $\omega_1$ usually lies in the ultraviolet portion of the spectrum. Stimulated Raman scattering produces a photon the frequency of which is equal to the difference between $\omega_1$ and the two-photon resonance $\Omega$. $\Omega$ then equals $\omega_1 - \omega_2$, not $2\omega_1$ as in the prior art illustrated in FIG. 2. The output at a frequency of $\omega_4$ is formed by adding the output frequency $\omega_3$ from a second laser, $\omega_4 = \omega_3 + \Omega = \omega_3 + \omega_1 + \omega_2$.

Between the two resonances of the doublet, the dispersion and hence the index changes very rapidly. It is possible, therefore, to produce a compromise between the frequency for optimum production of the stimulated Raman scattering (which is necessary to reach the two photon resonance $\Omega$), and between the frequency for optimum phase matching, The frequency range over which this method applies is fairly broad, but it does not begin to cover the entire spectrum. Limitations of this method are that it is difficult to produce $\omega_1$ efficiently for use in generating the higher ultraviolet because $\omega_1$ must be greater then $\Omega$; the frequency chosen must be a compromise between production of the Raman process and phase matching; for broader tunability, a phase-matching gas is required, with the consequent disadvantages discussed above; and the region between the two resonances of the doublet is one where the contribution from each resonance to the nonlinear susceptability is equal and opposite, with the result that the resonance enhancement is therefore substantially reduced, giving a low output level.

SUMMARY OF THE INVENTION

Our invention is a four-wave mixture method and apparatus for the production of continuously tunable, perfectly phase matched radiation over the complete spectrum from the far infrared to the vacuum ultraviolet. Our invention is based on a synergistic interaction between three lasers.

Specifically, according to a feature of our invention, phase matching is produced by means of the relationship between the three lasers providing the input frequencies. The lasers not only perform their function in the prior art — providing the input frequencies, but also perform a new function — providing the phase matching. Further, an element of the prior art apparatus is eliminated since a phase-matching gas is no longer required.

Our invention is based on the extra degree of freedom afforded by the third laser. This flexibility permits the simultaneous satisfaction of the resonance condition and the phase-matching condition. More specifically, FIG. 3 shows an energy-level diagram of the conversion medium. A desired output frequency $\omega_4$ and a convenient two-photon resonance $\Omega$, having been selected, frequency $\omega_3$ is chosen to combine with $\Omega$ in order to produce $\omega_4$ (either by addition or subtraction).

The remaining constraints on the system which must be satisfied are the resonance enhancement condition (that $\omega_1$ and $\omega_2$ must combine to a value close to the frequency of $\Omega$) and the phase-matching condition. With two variables (the frequencies $\omega_1$ and $\omega_3$) these two conditions may be met. Different choices of $\Omega$, the two-photon resonance, may be made in order to keep the values of $\omega_1$ and $\omega_2$ within a range that is convenient.

DETAILED DESCRIPTION

Mathematics

Figure 1:
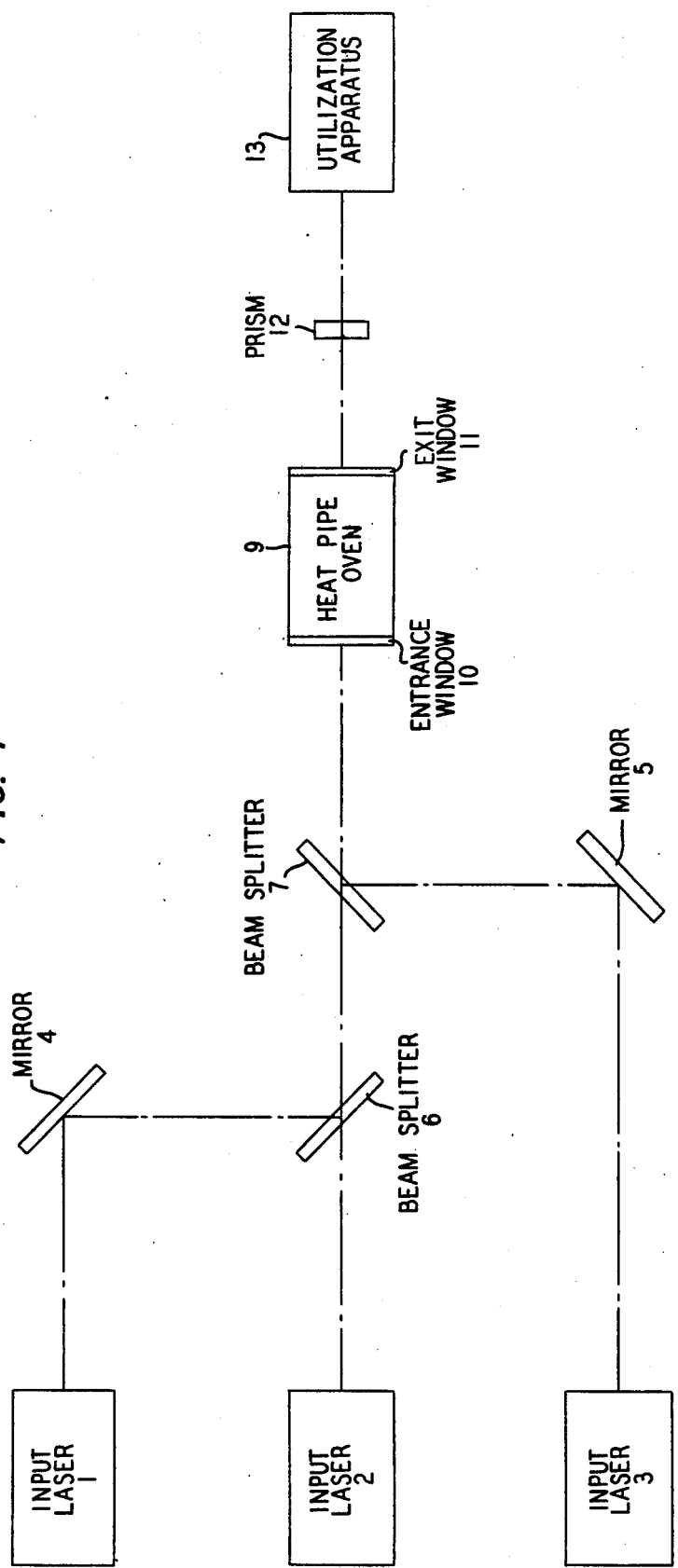
FIG. 1 is a partially schematic, partially pictorial diagram of an illustrative embodiment.
Figure 2:
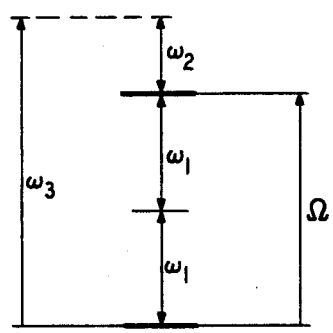
FIG. 2 is a level diagram illustrating a prior art device.
Figure 3:
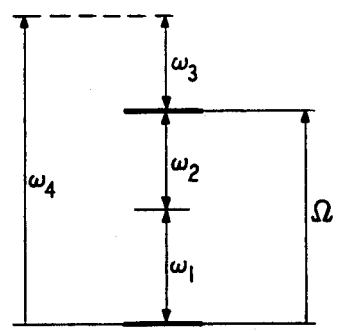
FIG. 3 is a level diagram illustrating a typical embodiment of our invention.
Figure 4:
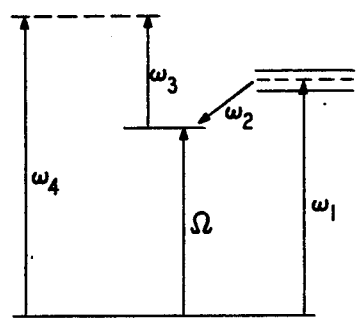
FIG. 4 is a level diagram illustrating a prior art device.

The essential step in adjusting the input frequencies for phase-matching is the computation of the correct values. We have the frequency condition $$\omega_4 = \omega_1 + \omega_2 + \omega_3; \quad (1)$$

the resonance enhancement condition $$\omega_1 + \omega_2 \approx \Omega; \quad (2)$$

and the phase-matching condition $$\omega_1 n_1 + \omega_2 n_2 + \omega_3 n_3 = \omega_4 n_4. \quad (3)$$

For convenience, we illustrate the mathematics by considering the condition where all signs are positive. The invention also applies to cases where $\omega_4$ or $\Omega$ is formed from the difference of input frequencies, e.g., $\omega_4 = \omega_1 + \omega_2 - \omega_3$, etc. Whenever the indices $n_i$ may be expressed in terms of $\omega_i$ and known parameters a suitable resonance $\Omega$ may be selected, and there will be three equations for the three unknowns $\omega_1$, $\omega_2$, $\omega_3$. The method applies to any conversion medium, although the computations are simpler for gases and vapors.

In the case of gases and vapors, $n(\omega)$ is given by the standard Sellmeier equation:

$$n(\omega) = 1 + \frac{N r_e \, 2\pi c^2 \Sigma}{j} \frac{f_j}{\omega_j^2 - \omega^2} \quad (6)$$

where $N$ = number of atoms/cm$^3$
$r_e = 2.818 \times 10^{-13}$ cm
$c = 3 \times 10^{10}$ cm/s
$f_j$ = oscillator strength of the $j^{th}$ transition
$\omega_j$ = frequency of the $j^{th}$ transition.

When the sum reduces to a reasonable number of terms with measured oscillator strengths, the set of equation (1), (2) and (3) may be solved. The number of terms required in the Sellmeier equation will vary, depending on whether one of the input frequencies is very close to a resonance or not, and a criterion is needed for the approximation involved in dropping terms from this equation. By its very nature, an approximation is somewhat imprecise and cannot be expected to give an exact value. An approximation is deemed to give sufficient accuracy when its errors are comparable to other sources of error in the calculation. For most sets of input frequencies, only the dominant transition frequency or transition frequencies need be included in the Sellmeier equation in order to calculate the index of refraction to approximately 1 percent, which is a reasonable error. When one of the input frequencies is quite close to a resonance of average strength (within 10A or so), that resonance must also be included in the Sellmeier equation. For purposes of this application a single-photon resonance (or group of resonances) is said to be dominant over a frequency range if the inclusion of only that term (or terms) in the Sellmeier equation predicts the index of refraction to within 1 percent for frequencies in that range, except for frequencies very close to a nondominant resonance, in which subrange the term corresponding to the nondominant resonance must be included in the Sellmeier equation.

In the particular case of the alkali metal vapors, where the conversion medium may be regarded as a three-level system with a single, strong, single-photon transition, the Sellmeier equation reduces to a single term, and the phase-matching condition becomes $$\frac{\omega_1}{\omega_0^2 - \omega_1^2} + \frac{(\Omega - \omega_1)}{\omega_0^2 - (\Omega - \omega_1)^2} = \frac{\omega_4}{\omega_0^2 - (\Omega - \omega_4)^2} + \frac{\Omega - \omega_4}{\omega_0^2 - (\Omega - \omega_4)^2} \quad (7)$$

where $\omega_0$ is the dominant transition.

The set of three equations may be solved for a real, nontrivial set of values for $\omega_1$, $\omega_2$, $\omega_3$. A generalized solution for this case is shown in Appendix A.

DESCRIPTION OF THE ILLUSTRATIVE EMBODIMENT

The invention has been practiced using Na vapor as a conversion medium, the apparatus shown partially in schematic, partially in pictorial form in FIG. 1. A Q-switched Nd:YAG laser (1) and two dye lasers (2), (3) (pumped by the second harmonic of the YAG laser) provided polarized radiation at frequencies $\omega_1$, $\omega_2$, and $\omega_3$. The $\omega_1$ radiation (pulse duration 6 nsec, linewidth 0.05 nm) was tunable around 612 nm, the $\omega_2$ radiation (pulse duration 10 nsec, linewidth 0.05 nm) was fixed at 1.064 $\mu$m, and the $\omega_3$ radiation (pulse duration 6 nsec, linewidth 0.025 nm) was tunable about 570 nm. Each of the beams was spatially filtered and collimated to a beam waist radius of $w_0 = 0.17$ cm. The incident fundamental beam powers were 4.4 kw at $\omega_1$, 1.1 kw at $\omega_2$ and 2.5 kw at $\omega_3$.

Since the Na vapor coats the windows of the heat pipe about 6 Torr of He buffer gas was used to protect the windows. The partial pressure of the He gas was very different from the pressure that would provide phase matching in this apparatus. Also, the heat pipe was not operated in the isothermal "heat pipe mode" and thus N(z) was far from constant along the hot zone.

As both uniformity and the correct pressure are required in order for a phase-matching gas to function, the contribution of the He buffer gas to the phase matching was negligible.

The beams were combined with parallel polarizations by means of mirrors 4, 5 and beamsplitters 6, 7; the various paths were adjusted to provide maximum temporal overlap of the input beams; and then the beams were passed through the heat pipe of conventional type (9) with a 90 cm long hot zone, the entrance window (10) and exit window (11) of which heat pipes are of material transparent to the radiation to be transmitted. Using thermocouples attached to the heatpipe, N(z), the number density of sodium atoms as a function of position, z, along the pipe could be determined. For each run the integrated number density was calculated by numerical integration of N(z). Frequency $\omega_1$ was adjusted to bring $\omega_1 + \omega_2$ into resonance with the 3S-4S two-photon transition at 25739 cm$^{-1}$. Frequency $\omega_3$ was varied and the generated radiation at $\omega_4 (= \omega_1 + \omega_2 + \omega_3)$ was isolated by means of a quartz prism (12) and detected with an EMR 542F-09-18 multiplier phototube (13). The signal was processed by a boxcar integrator and then displayed versus $\lambda_3$ on an X-Y recorder.

Figure 5:
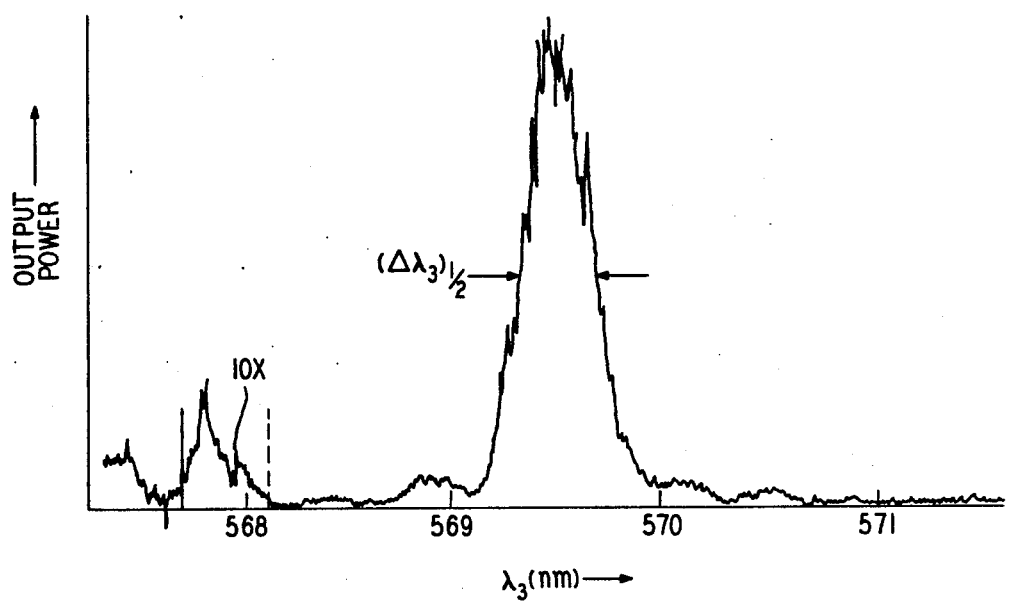
FIG. 5 is a plot of output power versus $\lambda_3$ for our illustrative embodiment.

Our theory predicted phase matching when $\lambda_3 = 570$ nm. The phase matching curve for integrated number density of $1.15 \times 10^{18}$ cm$^{-2}$ is reproduced in FIG. 5, showing agreement with the theory. The increase in output power when the phase-matching condition was satisfied was about several orders of magnitude. The observed sidelobes and the variation of the peak height and half-width with the integrated number density all show that essentially perfect phase matching was achieved.

APPENDIX A

The vast majority of possible two-photon-resonant four-wave mixing processes in the alkali metal vapors have phase-matching conditions which may be accurately determined from a simple three-level model which we discuss and demonstrate.

We assume that the nonlinear medium possesses a ground state of Energy $E_g$, an intermediate state of opposite parity to the ground state with energy $E_i$, and a final state of identical parity to the ground state of energy $E_f$. Then the frequency of the single photon resonance line is given by $\omega_o = (E_i - E_g)/h$ and the equivalent frequency of the two-photon transition is given by $\Omega = (E_f - E_g)/h$. Without loss of generality, all possible two-photon resonant four-wave mixing processes may be represented as one of the four following processes:

Process 1 has $\omega_1 + \omega_2 + \omega_3 \rightarrow \omega_4$ with $\omega_1 + \omega_2 = \Omega = \omega_4 - \omega_3$.

Process 2 has $\omega_1 - \omega_2 + \omega_3 \rightarrow \omega_4$ with $\omega_1 - \omega_2 = \Omega = \omega_4 - \omega_3$.

Process 3 has $\omega_1 + \omega_2 - \omega_3 \rightarrow \omega_4$ with $\omega_1 + \omega_2 = \Omega = \omega_4 + \omega_3$.

Process 4 has $\omega_1 - \omega_2 - \omega_3 \rightarrow \omega_4$ with $\omega_1 - \omega_2 = \Omega = \omega_4 + \omega_4 + \omega_3$.

Here, all frequencies are positive, the fundamental frequencies are $\omega_1$, $\omega_2$, and $\omega_3$; and the generated frequency is $\omega_4$. The index of refraction at each wavelength is assumed to be given a single term of the standard Sellmeier equation, $$n_i = n(\omega_i) = 1 + N2\pi c^2 r_e (f_o/\omega_o^2 - \omega_i^2), \quad (A1)$$

where N is the number of atoms/cm$^3$, $r_e = 2.818 \times 10^{-13}$ cm, $c = 3 \times 10^{10}$ cm/sec, and $f_o$ is the oscillator strenght of the transition. This approximation is quite valid for the alkali metals since the fundamental resonance line contains the bulk of the total oscillator strength of transitions from the ground state.

We now define the dimensionless parameters $\alpha_i = \pm \omega_i/\Omega$ and choose the signs according to the following 6 rules: For the parameters $\alpha_0$, $\alpha_1$, and $\alpha_4$ the plus sign is always chosen and for $\alpha_2$ and $\alpha_3$ the sign is chosen such that all four processes may now be represented by the single equation $$\alpha_1 + \alpha_2 = 1 = \alpha_3 + \alpha_4. \quad (A2)$$

The generalized collinear phase-matching condition, $n_1\alpha_1 + n_2\alpha_2 = n_3\alpha_3 + n_4\alpha_4$ reduces to $$\frac{\alpha_1}{\alpha_0^2 - \alpha_1^2} + \frac{1 - \alpha_1}{\alpha_0^2 - 0(1 - \alpha_1)^2} = \frac{\alpha_4}{\alpha_0^2 - \alpha_4^2} + \frac{1 - \alpha_4}{\alpha_0^2 - (1 - \alpha_4)^2}. \quad (A3)$$

Note that this phase matching condition is independent of the oscillator strength $f_o$ and of the number density N; and that the only parameter of the nonlinear medium which enters is $\alpha_0$, the ratio of the single photon resonance frequency to the two-photon frequency. From Equation (A3), $\alpha_4$ may be calculated as a function of $\alpha_1$ for each value of $\alpha_0$. Then Equation (A2) may be used to determine $\alpha_2$ and $\alpha_3$.

Figure 6:
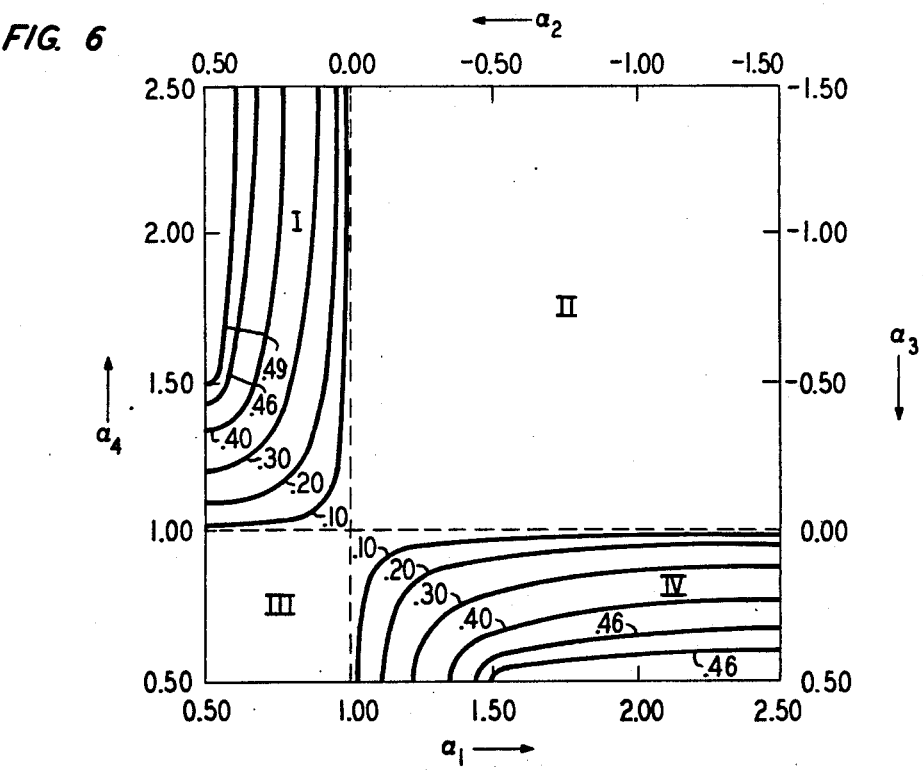
FIGS. 6 and 7 are plots of the input frequencies required to satisfy the phase matching and resonance enhancement conditions for a variety of conversion media.
Figure 7:
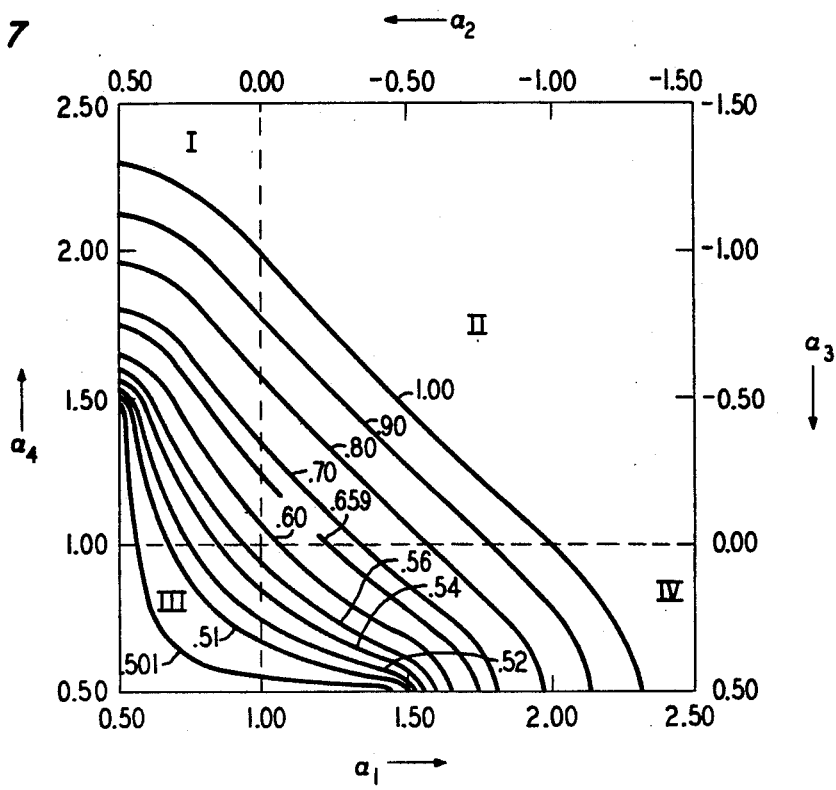

We show $\alpha_4$ (and $\alpha_3$) as a function of $\alpha_1$ (and $\alpha_2$) in FIG. 6 for values of $\alpha_0$ between 0.00 and 0.50 and in FIG. 7 for values of $\alpha_0$ between 0.50 and 1.00. These figures only show one quadrant of the total solution space since the solutions for $\alpha_4 < 0.50$ or $\alpha_1 < 0.50$ are easily obtained by interchanging $\alpha_4$ and $\alpha_3$ or $\alpha_1$ and $\alpha_2$, respectively. In these Figures, Regions I, II, III, and IV correspond to processes 1, 2, 3, and 4, respectively. It can be seen that for each value of $\alpha_0$ a wide range of values for $\alpha_4$ can be obtained by appropriately choosing $\alpha_1$, $\alpha_2$, and $\alpha_3$. When $\alpha_0$ is less than 0.50, only processes 1 and 4 can be phase-matched but the range of values for $\alpha_4$ extends to $\infty$. When $0.50 < \alpha_0 < 0.57$, processes 1, 3 and 4 may be phase-matched and when $0.57 < \alpha_0 < 1.00$, processes 1, 2 and 4 may be phase-matched. The approximation of Equation (A1) breaks down when any of the frequencies is very near to one of the other (weak) transitions from the ground state or when any of the frequencies is within a few line structure splittings of the doublet main resonance line. In these cases phase-matched solutions still may be obtained by including other terms of the Sellmeier equation.

We claim:

1. An apparatus for generating an output frequency $\omega_4$ comprising:
   first, second, and third lasers for generating input beams having frequencies $\omega_1$, $\omega_2$, and $\omega_3$, respectively, the extremes of which frequencies define a frequency range,
   an interaction medium having at least one two-photon resonance coupled to the ground state of said interaction medium and at least one strong one-photon resonance coupled to the ground state of said interaction medium, the frequency of which one-photon resonance is within said frequency range,
   means for directing said beams of said first, second and third lasers substantially collinearly onto said interaction medium, and
   means for extracting said output frequency $\omega_4$ from said interaction medium,
   characterized in that the frequencies of said first, second, and third lasers are adjusted to satisfy three conditions simultaneously: the output frequency $\omega_4$ is equal to a linear combination of $\omega_1$, $\omega_2$ and $\omega_3$; the frequency of said two-photon resonance is nearly equal to a linear combination of $\omega_1$ and $\omega_2$; and the phase-matching equation is substantially satisfied by $\omega_1$, $\omega_2$, $\omega_3$ and $\omega_4$, whereby said first, second and third lasers perform the function of phase-matching the output frequency in addition to performing the function of providing said frequencies $\omega_1$, $\omega_2$ and $\omega_3$ which combine to form said output frequency.

2. An apparatus for generating an output frequency according to claim 1 in which the interaction medium has the property that said frequency range is dominated by a few strong one-photon resonances, at least one of which is within said frequency range.

3. An apparatus for generating an output frequency according to claim 1 in which the interaction medium has the property that there is a single strong one-photon resonance which dominates said frequency range, the frequency of which one-photon resonance lies within said frequency range.

4. An apparatus for generating an output frequency according to claim 2 in which the interaction medium is an alkali metal vapor, the concentration of which is not uniform.

5. An apparatus for generating an output frequency according to claim 3 in which the interaction medium is an alkali metal vapor, the concentration of which is not uniform.

6. An apparatus for generating an output frequency according to claim 1 in which the interaction medium is a solid, liquid, or plasma.

7. An apparatus for generating an output frequency according to claim 2 in which the interaction medium is a solid, liquid, or plasma.

8. A method of generating an output frequency $\omega_4$, comprising the steps of:
   a. combining collinearly the beams from a first, second and third input laser, which beams are of frequency $\omega_1$, $\omega_2$ and $\omega_3$, respectively,
   b. directing the combined beams onto an interaction medium having at least one two-photon resonance and at-least one strong one-photon resonance within a frequency range defined by the frequencies of said input lasers,
   c. setting the frequencies of said first, second and third input lasers to predetermined values such that three conditions are simultaneously satisfied: the output frequency $\omega_4$ is equal to a linear combination of $\omega_1$, $\omega_2$ and $\omega_3$; the frequency of said two-photon resonance is nearly equal to a linear combination of $\omega_1$ and $\omega_2$; and the phase-matching equation is substantially satisfied by $\omega_1$, $\omega_2$, $\omega_3$ and $\omega_4$, whereby said first, second and third lasers perform the function of phase-matching the output frequency in addition to performing the function of providing frequencies $\omega_1$, $\omega_2$ and $\omega_3$ and
   d. extracting said output frequency from said interaction medium.

* * * * *